(12) United States Patent
Heckert et al.

(10) Patent No.: US 12,155,080 B2
(45) Date of Patent: Nov. 26, 2024

(54) PROTECTIVE UNIT FOR A BATTERY MODULE OF A HIGH-VOLTAGE BATTERY, BATTERY MODULE, AND HIGH-VOLTAGE BATTERY

(71) Applicant: Bayerische Motoren Werke Aktiengesellschaft, Munich (DE)

(72) Inventors: Andre Heckert, Munich (DE); Michael Huber, Munich (DE); Tuncay Idikurt, Munich (DE); Andreas Klaffki, Unterschleissheim (DE); Philipp Schmidt, Munich (DE); Patrick Schmitz, Munich (DE); Sebastian Siering, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 414 days.

(21) Appl. No.: 16/981,097

(22) PCT Filed: Sep. 18, 2019

(86) PCT No.: PCT/EP2019/074969
§ 371 (c)(1),
(2) Date: Sep. 15, 2020

(87) PCT Pub. No.: WO2020/078649
PCT Pub. Date: Apr. 23, 2020

(65) Prior Publication Data
US 2020/0411823 A1    Dec. 31, 2020

(30) Foreign Application Priority Data
Oct. 16, 2018    (DE) .................. 10 2018 125 618.3

(51) Int. Cl.
*H01M 10/00* (2006.01)
*H01M 50/209* (2021.01)
(Continued)

(52) U.S. Cl.
CPC ......... *H01M 50/24* (2021.01); *H01M 50/209* (2021.01); *H01M 50/249* (2021.01);
(Continued)

(58) Field of Classification Search
CPC ............. H01M 2200/30; H01M 50/50; H01M 50/574; H01M 50/579–581;
(Continued)

(56) References Cited

U.S. PATENT DOCUMENTS

| | | | |
|---|---|---|---|
| 2011/0045335 A1 | 2/2011 | Lee et al. | |
| 2013/0004813 A1* | 1/2013 | Kim | H01M 10/613 429/87 |

(Continued)

FOREIGN PATENT DOCUMENTS

| | | |
|---|---|---|
| CN | 102369625 A | 3/2012 |
| CN | 102804447 A | 11/2012 |

(Continued)

OTHER PUBLICATIONS

Machine translation of KR-20160043353-A, as obtained from PE2E search. Translation obtained on Dec. 19, 2022. (Year: 2016).*

(Continued)

*Primary Examiner* — Nicholas P D'Aniello
(74) *Attorney, Agent, or Firm* — Crowell & Moring LLP

(57) ABSTRACT

A protective unit is provided for a battery module of a high-voltage battery of a motor vehicle for electrically insulating cell housings of prismatic battery cells of the battery module, which battery cells are stacked to form a cell stack. A cell-contacting system of the battery module interconnects the battery cells by electrically connecting cell terminals of the battery cells. The protective unit includes a pre-formed intermediate layer made of an electrically insulating material, which intermediate layer can be applied to a side of the cell stack having the cell terminals and can be (Continued)

arranged between the side of the cell stack having the cell terminals and the cell-contacting system. The intermediate layer has a number of cut-outs which corresponds to the number of cells terminals. The cut-outs are provided for the feeding through of the cell terminals when the intermediate layer is applied to the cell stack.

7 Claims, 2 Drawing Sheets

(51) Int. Cl.
*H01M 50/24* (2021.01)
*H01M 50/249* (2021.01)
*H01M 50/579* (2021.01)
*H01M 50/502* (2021.01)

(52) U.S. Cl.
CPC ........ *H01M 50/579* (2021.01); *H01M 50/502* (2021.01); *H01M 2200/30* (2013.01); *H01M 2220/20* (2013.01)

(58) Field of Classification Search
CPC ......... H01M 50/59–597; H01M 50/24; H01M 50/209; H01M 50/249; H01M 50/502; H01M 2220/20
See application file for complete search history.

(56) References Cited

U.S. PATENT DOCUMENTS

| | | |
|---|---|---|
| 2013/0078487 A1 | 3/2013 | Shin et al. |
| 2014/0335378 A1 | 11/2014 | Kuroda |
| 2015/0380699 A1* | 12/2015 | Ikeda .................... H01M 50/59 429/159 |
| 2017/0110698 A1 | 4/2017 | Kim et al. |
| 2017/0244081 A1* | 8/2017 | Tononishi ............. H01M 10/62 |
| 2017/0244139 A1 | 8/2017 | Tononishi |
| 2018/0190954 A1 | 7/2018 | Hashimoto et al. |

FOREIGN PATENT DOCUMENTS

| | | | |
|---|---|---|---|
| CN | 104143666 A | 11/2014 | |
| CN | 106601945 A | 4/2017 | |
| CN | 107068921 A | 8/2017 | |
| DE | 10 2008 059 971 A1 | 6/2010 | |
| DE | 10 2017 202 981 A1 | 8/2017 | |
| EP | 3 159 951 A1 | 4/2017 | |
| JP | 2014-89912 A | 5/2014 | |
| KR | 20160043353 A * | 6/2016 | .............. Y02P 70/50 |

OTHER PUBLICATIONS

International Search Report (PCT/ISA/210) issued in PCT Application No. PCT/EP2019/074969 dated Jan. 2, 2020 with English translation (four (4) pages).

German-language Written Opinion (PCT/ISA/237) issued in PCT Application No. PCT/EP2019/074969 dated Jan. 2, 2020 (seven (7) pages).

German-language Office Action issued in German Application No. 10 2018 125 618.3 dated Jul. 3, 2019 (eight (8) pages).

Chinese-language Office Action issued in Chinese Application No. 201980026217.0 dated Jun. 6, 2022 with English translation (15 pages).

* cited by examiner

PROTECTIVE UNIT FOR A BATTERY MODULE OF A HIGH-VOLTAGE BATTERY, BATTERY MODULE, AND HIGH-VOLTAGE BATTERY

BACKGROUND AND SUMMARY OF THE INVENTION

The invention relates to a protective unit for a battery module of a high-voltage battery of a motor vehicle for electrically insulating cell housings of prismatic battery cells, stacked to form a cell stack, of the battery module and a cell-contacting system of the battery module that interconnects the battery cells by electrically connecting cell terminals, that is to say positive poles and negative poles, of the battery cells. The invention also relates to a battery module and to a motor vehicle.

The present concern is rechargeable high-voltage batteries or high-voltage storage batteries for electrically propelled motor vehicles, for example electric vehicles or hybrid vehicles. The high-voltage batteries normally comprise a plurality of battery cells interconnected to form battery modules. The battery cells may be prismatic battery cells, for example, each having a metal cell housing, wherein the battery cells are stacked to form cell stacks and are connected up to one another by means of a cell-contacting system. To this end, cell terminals routed out of the cell housings on one side of the cell stack are electrically connected to one another in accordance with a predetermined configuration.

In the event of the intrusion of a foreign body, for example during a crash or accident involving the motor vehicle in which a bodywork of the motor vehicle and, as a result, the battery cells are deformed, the battery cells can become damaged. This damage to the battery cells can lead to a cell-internal short, which in turn can lead to a thermal runaway of the battery cells and hence to a fire in the high-voltage battery. In this regard, DE 10 2008 059 971 A1 discloses a battery having a plurality of individual cells and also a cold plate arranged on the pole side of the individual cells and an electronic unit. At least one of these battery components arranged on the pole side is surrounded by an electrically insulating protective layer. For example, at least one of the battery components may, to that end, be encapsulated with the material forming the protective layer.

It is an object of the present invention to provide an alternative solution for how a high-voltage battery for a motor vehicle can be protected particularly easily and inexpensively from a thermal runaway of battery cells of the high-voltage battery.

This object is achieved according to the invention by a protective unit, a battery module, and a high-voltage battery having the features according to the respective independent patent claims. Advantageous embodiments of the invention are the subject of the dependent patent claims, the description and the figures.

A protective unit according to the invention for a battery module of a high-voltage battery of a motor vehicle is used for electrically insulating cell housings of prismatic battery cells, stacked to form a cell stack, of the battery module, and a cell-contacting system of the battery module that interconnects the battery cells by electrically connecting cell terminals of the battery cells. The protective unit has a preformed intermediate layer made from an electrically insulating material, which intermediate layer is able to be put onto a side of the cell stack that has the cell terminals and is therefore able to be arranged between the side of the cell stack that has the cell terminals and the cell-contacting system in a nondestructively detachable manner. The intermediate layer has a number of cutouts, corresponding to a number of cell terminals, for routing through the cell terminals when the intermediate layer is put onto the cell stack.

The invention additionally relates to a battery module for a high-voltage battery of a motor vehicle, having at least one cell stack comprising prismatic battery cells, a cell-contacting system for making contact with cell terminals of the battery cells, and at least one protective unit according to the invention, wherein the intermediate layer is arranged between the side of the cell stack that has the cell terminals and the cell-contacting system.

The prismatic battery cells each have a flat parallelepipedal cell housing that is formed from an electrically conductive material, for example from aluminum. The cell housings have housing walls in the form of a housing base, a housing cover, a housing front wall, a housing rear wall and two housing side walls. One of the housing walls, for example the housing cover, has cell terminals or cell poles arranged on it, which are electrically connected to a galvanic element inside the cell housing. The battery cells can be stacked in a stack direction to form the at least one cell stack, wherein the side of the cell stack that has the cell terminals (the cell terminal side or pole side for short) is formed by the housing walls of the cell housings with the cell terminals, for example. The cell terminals extend in particular in two parallel rows, oriented in the stack direction, over the rectangular cell terminal side of the cell stack.

To interconnect the battery cells in accordance with a predetermined configuration, the cell terminals of the battery cells can be electrically connected to one another by means of the cell-contacting system. The cell-contacting system has an electrically insulating frame, e.g. a plastic frame, on which cell connectors are arranged and held, for example. When the frame is arranged on the cell terminal side of the cell stack, the cell connectors are placed on the cell terminals of the battery cells such that they connect the cell terminals in accordance with the predetermined configuration.

To prevent the cell-contacting system from moving in the event of an accident-related intrusion such that the cell connectors touch the electrically conductive cell housings and therefore cause a short between the battery cells, there is provision for the protective unit. The protective unit comprises the preformed intermediate layer, which is formed from an electrically insulating material, preferably an electrically insulating plastic. The intermediate layer is a substantive element or molded body, for example a flat insulating mat, that is able to be arranged on the cell terminal side of the cell stack by placing it on as a whole and without changing its physical state, and in particular is also able to be detached from the cell terminal side again nondestructively. The intermediate layer is therefore not a sealing compound or coating.

The intermediate layer has the cutouts, the number and shape of which correspond to the cell terminals. The cutouts may thus be rectangular openings through which the cell terminals of rectangular cross section are routed when the intermediate layer is arranged onto the cell terminal side. The intermediate layer thus covers only that region of the cell terminal side of the cell stack that is formed by the electrically conductive housing walls, but not the cell terminals themselves. In particular, external dimensions of the rectangular intermediate layer correspond to external dimensions of the side of the cell stack that has the cell terminals, so that, in the state arranged on the cell terminal side of the cell stack, the intermediate layer completely covers the region of the cell terminal side that is formed by the housing walls of the cell housings. Thus, in the state in which the intermediate layer is arranged on the pole side, only surfaces of the cell terminals are then visible.

After the intermediate layer has been arranged on the cell terminal side of the cell stack, the cell-contacting system is arranged on the intermediate layer. The intermediate layer thus separates the region of the cell terminal side of the cell stack that is formed by the electrically conductive housing walls and the cell connectors of the cell-contacting system. The intermediate layer can thus advantageously prevent an electrical connection between the cell housings and the cell connectors in the event of a deformation of the high-voltage battery, since the cell connectors touch only the electrically nonconductive intermediate layer, but not the cell housings, in the event of deformation-related slippage. Additionally, a preformed intermediate layer of this kind can be manufactured easily and in large numbers.

There may be provision for the intermediate layer to be in the form of an electrically insulating perforated plate or a perforated film. By way of example, the intermediate layer may be in the form of a plastic plate, which is particularly robust. Alternatively, the intermediate layer may be in the form of the film, which can be produced with a particularly small layer thickness and therefore has a low installation space requirement.

It is found to be advantageous if the intermediate layer has a number of openings, corresponding to a number of degassing openings of the battery cells, that are able to be arranged flush with the degassing openings of the battery cells when the intermediate layer is arranged on the side of the cell stack that has the cell terminals. The degassing openings are arranged in a housing wall of the cell housings of the battery cells, in particular between the cell terminals. Through these degassing openings, which are sealed in gas-tight fashion by a bursting membrane in a normal state of the battery cells, it is possible for a hot gas formed in the cell housing in the event of damage to the battery cell to escape. The openings in the intermediate layer can extend in a row over the intermediate layer between the two rows with the cutouts for the cell terminals. In the state in which the intermediate layer is arranged on the cell terminal side, the openings are arranged flush with the degassing openings. As such, the hot gas escaping from the cell housing can escape via the openings in the intermediate layer.

In a development of the invention, the protective unit has a heat-resistant protective mat that is secured to the intermediate layer and that is able to be arranged so as to pass over the degassing openings of the battery cells when the intermediate layer is arranged on the side of the cell stack that has the cell terminals. In particular, the heat-resistant protective mat is in strip-shaped form and extends over a length of the intermediate layer. Preferably, the heat-resistant protective mat is formed from a glass fiber material or glass fiber composite material. The heat resistance of the protective mat means that it is resistant to the high temperatures of the hot gas and is therefore not destroyed by the hot gas. By way of example, the strip-shaped protective mat can cover the row with the openings in the intermediate layer and prevent the high-voltage battery from starting to burn in the event of the hot gas emerging from the cell housing. Additionally, the protective mat shields adjacent parts, such as the cell-contacting system or adjoining battery cells, from high temperatures and therefore prevents a thermal runaway of the battery cells.

The invention additionally relates to a high-voltage battery for a motor vehicle, having at least one battery module according to the invention. The high-voltage battery is in particular in the form of a rechargeable traction battery for an electrically propellable motor vehicle.

The embodiments presented with reference to the protective unit according to the invention, and the advantages of said embodiments, apply accordingly to the battery module according to the invention and to the high-voltage battery according to the invention.

Further features of the invention will emerge from the claims, the figures and the description of the figures. The features and combinations of features cited in the description hereinabove and the features and combinations of features cited in the description of the figures hereinbelow and/or shown in the figures alone are usable not only in the particular indicated combination but also in other combinations or on their own.

The invention will now be explained in more detail on the basis of a preferred exemplary embodiment and with reference to the drawings.

In the figures, elements that are the same and that have the same function are provided with the same reference signs.

DETAILED DESCRIPTION OF THE DRAWINGS

Figure 1:
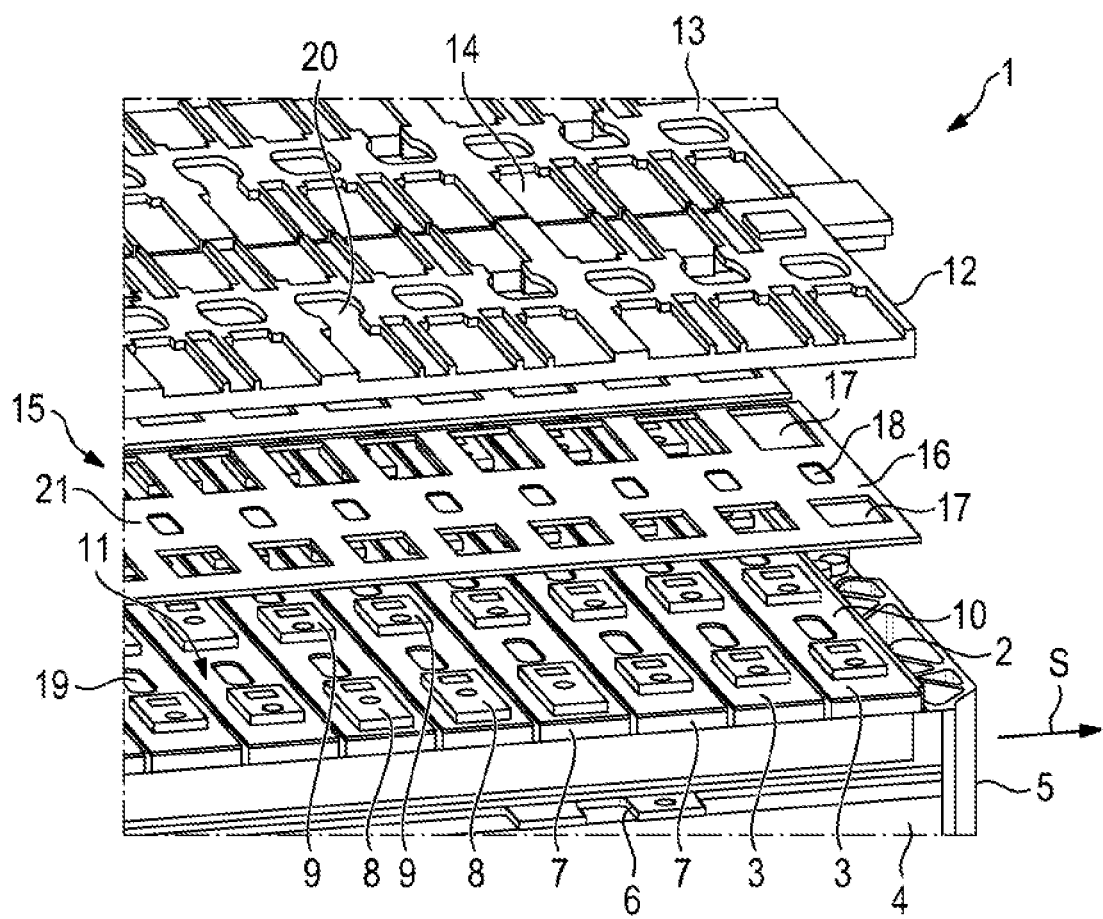
FIG. 1 is a schematic exploded view of a first embodiment of a battery module according to the invention.
Figure 2:
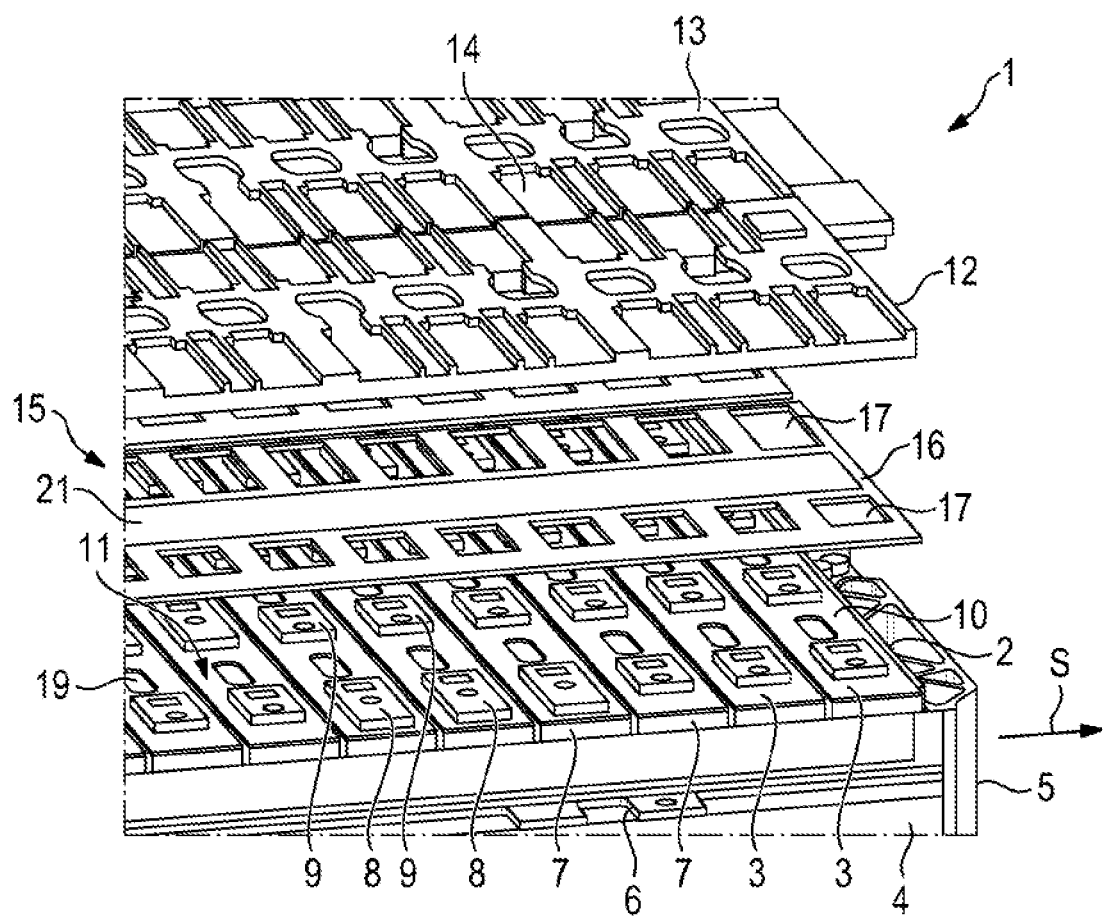
FIG. 2 is a schematic exploded view of a second embodiment of a battery module according to the invention.

FIG. 1 and FIG. 2 show exploded views of a battery module 1 for a high-voltage battery, not shown here, of an electrically propelled motor vehicle. The battery module 1 here has two cell stacks 2 comprising prismatic battery cells 3 stacked against one another in a stack direction S. The cell stacks 2 here are arranged beside one another at right angles to the stack direction S. Each cell stack 2 here is surrounded by a cell module frame 4. The cell module frame 4 has two pressure plates 5, only one of which is shown here, which are arranged on two opposite sides of the cell stack 2 in the stack direction S. To clamp the battery cells 3 inside the cell stack 2, the pressure plates 5 are connected to one another by means of tie rods 6, which are arranged on side regions of the cell stack 2 that are opposite at right angles to the stack direction S.

The battery cells 3 have cell housings 7 made from an electrically conductive material, for example aluminum, and cell terminals 8, 9, which are arranged on a housing wall of the cell housing 7, here on a housing cover 10. The housing covers 10 and the cell terminals 8, 9 of a cell stack 2 here form a cell terminal side 11 of the cell stack 2. The cell terminals 8 may be positive poles of the battery cells 3 and the cell terminals 9 may be negative poles of the battery cells 3, for example. The cell terminals 8, 9 here extend in the stack direction S in two rows running parallel to one another. To interconnect the battery cells 3 in accordance with a predetermined configuration, the cell terminals 8, 9 of the battery cells 3 are electrically connected to one another by means of a cell-contacting system 12. Here, three adjoining battery cells 3 of a cell stack 2 are each connected in parallel and the parallel connections are connected in series. To this end, the cell-contacting system 12 has an electrically insulating support in the form of a frame 13, which holds electrically conductive cell connectors 14. When the frame 13 is arranged on the cell terminal side 11 of the cell stack 2, the cell connectors 14 are placed on the cell terminals 8, 9 such that the predetermined configuration is obtained.

In the event of an accident involving the motor vehicle, the battery module 1 may now be deformed. The deformation can result in the cell-contacting system 12 moving or being deformed relative to the cell terminal side 11 and therefore in the cell connectors 14 no longer being arranged on the cell terminals 8, 9. In order to prevent the cell connectors 14 from touching the electrically conductive housing covers 10, the battery module 1 has a protective unit 15. The protective unit 15 has a preformed intermediate layer 16 or insulating mat made from an electrically insulating material. The intermediate layer 16 can be a plastic film or plastic plate, for example. The intermediate layer 16 has cutouts 17 that correspond to the cell terminals 8, 9. When the intermediate layer 16 is put onto the cell terminal side 11 of the cell stack 2, the cell terminals 8, 9 are routed through the cutouts 17 and the intermediate layer 16 is arranged on the electrically conductive housing covers 10 of the battery cells 3. After the intermediate layer 16 has been arranged on the cell terminal side 11 of the cell stack 2, the cell-contacting system 12 can be put onto the intermediate layer 16. If the cell-contacting system 12 now moves relative to the cell terminal side 11, the cell connectors 14 touch only the electrically insulating intermediate layer 16. An unwanted electrical connection to the electrically conductive cell housings 7 of the battery cells 3 is prevented.

In the embodiment of the battery module 1 shown in FIG. 1, the intermediate layer 16 additionally has openings 18 that correspond to degassing openings 19 of the battery cells 3. Through the degassing openings 19, hot gas can escape from the cell housing 7 in the event of an emergency degassing of the battery cells 3. In the fault-free state of the battery cells 3, the degassing opening 19 is covered by a bursting membrane that seals the cell housing 7 in gas-tight fashion. In the event of damage, the bursting membrane tears on account of the internal pressure rising in the cell housing 7 and clears the degassing opening 19. In the state in which the intermediate layer 16 is arranged on the cell terminal side 11, the openings 18 are arranged flush with the degassing openings 19. The hot gas can therefore escape via the degassing openings 19 of the cell housings 7, the openings 18 in the intermediate layer 16 and holes 20 in the frame 13 of the cell-contacting system 12 into a receiving space of a battery housing in which the battery module 1 is arranged.

In the embodiment of the battery module 1 shown in FIG. 2, the protective unit 15 has a heat-resistant protective mat 21, which is in strip-shaped form here. The protective mat 21 here is integrated in the intermediate layer 16 and arranged between the two rows with the cutouts 17. The protective mat 21 covers the openings 18 and is therefore placed in the region of the degassing openings 19. The protective mat 21 is formed from a glass fiber composite material, for example. The protective mat 21 protects current-carrying components of the high-voltage battery from the hot gas and additionally prevents fire and flames from leaving the battery housing.

LIST OF REFERENCE SIGNS 1 battery module
2 cell stack
3 battery cell
4 cell module frame
5 pressure plate
6 tie rod
7 cell housing
8 cell terminal
9 cell terminal
10 housing cover
11 cell terminal side
12 cell-contacting system
13 frame
14 cell connector
15 protective unit
16 intermediate layer
17 cutouts
18 openings
19 degassing openings
20 holes
21 protective mat
S stack direction.

What is claimed is:

1. A battery module for a high-voltage battery of a motor vehicle, the battery module comprising:
   at least one cell stack comprising prismatic battery cells;
   a cell-contacting system for making contact with cell terminals of the battery cells, wherein the cell-contacting system comprises an electrically insulating frame on which cell connectors for connecting the cell terminals of the battery cells are arranged and held, and wherein the cell connectors are arranged on the cell terminals of the battery cells; and
   a protective unit for electrically insulating cell housings of the battery cells and the cell connectors of the cell-contacting system, the protective unit comprising:
   a preformed intermediate layer made from an electrically insulating material, which intermediate layer is placeable onto a side of the cell stack that has the cell terminals so as to be arranged between the side of the cell stack that has the cell terminals and the cell-contacting system, wherein:
      the intermediate layer is arranged between the side of the cell stack that has the cell terminals and the cell-contacting system,
      the intermediate layer has a number of cutouts, equal to a number of cell terminals, through which the cell terminals are routed when the intermediate layer is placed onto the cell stack,
      the intermediate layer has a number of openings, corresponding to a number of degassing openings of the battery cells, that are arranged flush with the degassing openings of the battery cells when the intermediate layer is arranged on the side of the cell stack that has the cell terminals, and
      the intermediate layer is an electrically insulating perforated film, and
   a heat-resistant protective mat secured to the intermediate layer, wherein the heat-resistant protective mat is arranged to cover the openings of the intermediate layer and to pass over the degassing openings of the battery cells when the intermediate layer is arranged on the side of the cell stack that has the cell terminals.

2. The battery module according to claim 1, wherein external dimensions of the intermediate layer form a rectangle and correspond to external dimensions of a rectangular side of the cell stack that has the cell terminals, so that the intermediate layer completely covers a region of the side that is formed by housing walls of the cell housings.

3. The battery module according to claim 1, wherein the intermediate layer is formed from an electrically insulating plastic.

4. The battery module according to claim 1, wherein the heat-resistant protective mat is in strip-shaped form and extends over a length of the intermediate layer.

5. The battery module according to claim 4, wherein the heat-resistant protective mat is formed from a glass fiber material.

6. The battery module according to claim 1, wherein the heat-resistant protective mat is formed from a glass fiber material.

7. A high-voltage battery for a motor vehicle comprising at least one battery module according to claim 1.

* * * * *